United States Patent
Lee et al.

(10) Patent No.: US 11,031,660 B2
(45) Date of Patent: Jun. 8, 2021

(54) POUCH TYPE BATTERY CELL

(71) Applicants: Hyundai Motor Company, Seoul (KR); Kia Motors Corporation, Seoul (KR)

(72) Inventors: SangJoon Lee, Gyeonggi-do (KR); Yoon Ji Lee, Gyeonggi-do (KR); Seung Ho Ahn, Gyeonggi-do (KR); DongHui Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 280 days.

(21) Appl. No.: 16/262,207

(22) Filed: Jan. 30, 2019

(65) Prior Publication Data

US 2020/0136122 A1  Apr. 30, 2020

(30) Foreign Application Priority Data

Oct. 24, 2018 (KR) .................. 10-2018-0127355

(51) Int. Cl.
| | |
|---|---|
| *H01M 2/26* | (2006.01) |
| *H01M 2/30* | (2006.01) |
| *H01M 10/04* | (2006.01) |
| *H01M 50/543* | (2021.01) |
| *H01M 50/531* | (2021.01) |

(52) U.S. Cl.
CPC ..... *H01M 50/543* (2021.01); *H01M 10/0413* (2013.01); *H01M 50/531* (2021.01); *H01M 2220/20* (2013.01)

(58) Field of Classification Search
CPC .. H01M 2/021; H01M 2/0212; H01M 2/0275; H01M 2/26; H01M 2/30; H01M 2/305; H01M 10/0413; H01M 2220/20; Y02E 60/10
See application file for complete search history.

(56) References Cited

U.S. PATENT DOCUMENTS

2010/0015511 A1* 1/2010 Yoo .................. H01M 2/1022
                                                          429/94
2019/0190092 A1* 6/2019 Kim .................... H01M 2/26

FOREIGN PATENT DOCUMENTS

| KR | 2016-0088647 A | 7/2016 |
|---|---|---|
| KR | 2016-0128114 A | 11/2016 |
| WO | WO 2018-128283 | * 7/2018 |

* cited by examiner

*Primary Examiner* — Brittany L Raymond
(74) *Attorney, Agent, or Firm* — Mintz Levin Cohn Ferris Glovsky; Peter F. Corless

(57) ABSTRACT

A pouch type battery cell is provided. The battery cell includes a negative electrode and a positive electrode that overlap each other while spaced apart from each other. The negative electrode includes a pair of negative terminals that protrude from a first side of opposite ends of the negative electrode. Additionally, the positive electrode includes a pair of positive terminals that protrude from a second side of opposite ends of the positive electrode.

7 Claims, 8 Drawing Sheets

POUCH TYPE BATTERY CELL

CROSS-REFERENCE TO RELATED APPLICATION(S)

This application is based on and claims priority under 35 U.S.C. § 119 to Korean Patent Application No. 10-2018-0127355, filed on Oct. 24, 2018, the disclosure of which is incorporated by reference herein in its entirety.

BACKGROUND

1. Technical Field

The present disclosure relates to a pouch type battery cell that prevents a decrease in output that occurs as length thereof increases.

2. Description of the Related Art

A pouch type battery cell includes a positive electrode, a negative electrode, a separator and an electrolyte. A plurality of pouch type battery cells are connected to each other to form battery cells. Recently, the shape of the pouch type battery cell has changed in a direction of decreasing the width to be more easily mounted on a vehicle while being lengthened to maximize energy density. However, when the length of the pouch type battery cell is increased, the movement distance of the electrons is increased, and thus, the output of the pouch type battery cell may be reduced.

SUMMARY

It is an aspect of the present disclosure to provide a pouch type battery cell that may prevent the output from decreasing while increasing the length thereof. Additional aspects of the present disclosure will be set forth in part in the description which follows and, in part, will be obvious from the description, or may be learned by practice of the disclosure.

In accordance with an aspect of the present disclosure, a pouch type battery cell may include a negative electrode and a positive electrode that overlap each other while spaced apart from each other. The negative electrode may include a pair of negative terminals that protrude from a first side of opposite ends of the negative electrode, and the positive electrode may include a pair of positive terminals that protrude from a second side of opposite ends of the positive electrode.

The pouch type battery cell may further include negative lead tabs having a first end connected to the negative terminals and a second end that extends toward the positive terminals, and positive lead tabs having a first end connected to the positive terminals and a second end that extends toward the negative terminals. The positive lead tabs and the second ends of the negative terminals, and the negative lead tabs and the second ends of the positive terminals may be insulated by an insulator, respectively.

Additionally, the negative electrode may include a plate-shaped negative electrode portion and the positive electrode may include a plate-shaped positive electrode portion. The pouch type battery cell may include a separator disposed between the negative electrode portion and the positive electrode portion to overlap the negative electrode portion and the positive electrode portion while spaced apart from each other.

Further, the pouch type battery cell may include a pouch for accommodating the pair of positive terminals and the pair of negative terminals. The pouch may include an electrode accommodating portion for accommodating the positive electrode portion and the negative electrode portion that are overlapped with each other, a pair of negative terminal accommodating portions disposed at a first side of opposite ends of the pouch to accommodate the pair of negative terminals, and a pair of positive terminal accommodating portions disposed at a second side of the opposite ends of the pouch to accommodate the pair of positive terminals. The negative lead tabs may protrude outward by passing through the negative terminal accommodating portions, and the positive lead tabs may protrude outward by passing through the positive terminal accommodating portions.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
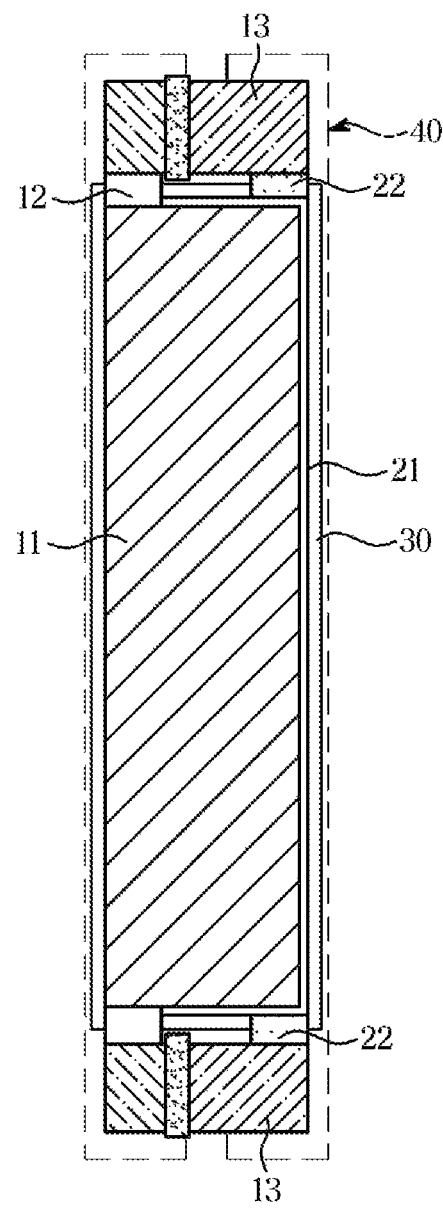
FIG. 1 is a schematic view illustrating an internal structure of a pouch type battery cell according to an exemplary embodiment of the present disclosure.
Figure 2:
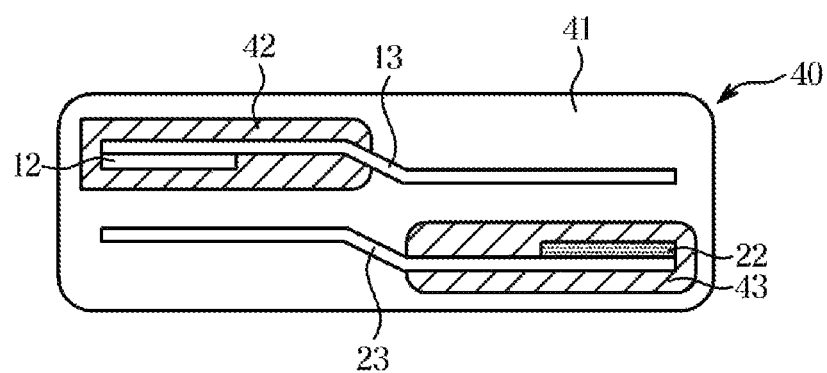
FIG. 2 is a cross-sectional view illustrating an installation state of terminals and lead tabs in a pouch type battery cell according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The embodiments described herein and the configurations shown in the drawings are only examples of exemplary embodiments of the present disclosure, and various modifications may be made at the time of filing of the present disclosure to replace the embodiments and drawings of the present specification.

Like reference numbers or designations in the various figures of the present application represent parts or components that perform substantially the same functions. The terms used herein are for the purpose of describing the exemplary embodiments and are not intended to restrict and/or to limit the disclosure. In this specification, the terms "front," "rear," "upper," "lower," "left," and "right" are defined with reference to the drawings, and the shape and position of each component are not limited by these terms.

Hereinafter, exemplary embodiments according to the present disclosure will be described in detail with reference to the accompanying drawings. As illustrated in FIG. 1, a pouch type battery cell according to an aspect of the present disclosure may include a negative electrode 10 and a positive electrode 20 stacked alternately, a separator 30 disposed between the negative electrode 10 and the positive electrode 20 to separate the negative electrode 10 and the positive electrode 20 from each other, and a pouch 40 for accommodating the negative electrode 10, the positive electrode 20, the separator 30, and an electrolyte.

Particularly, the negative electrode 10 may include a negative electrode portion 11 formed in the shape of a rectangular flat plate, and a pair of negative terminals 12 that protrude from a first side of opposite ends of the negative electrode portion 11. The positive electrode 20 may include a positive electrode portion 21 formed in the shape of a rectangular flat plate, and a pair of positive terminals 22 that protrude from a second side of opposite ends of the positive electrode portion 21.

The separator 30 may be disposed between the negative electrode 10 and the positive electrode 20 to cause the negative electrode 10 and the positive electrode 20 to overlap each other. The separator 30 may be formed in the shape of a rectangular plate and may be disposed between the negative electrode portion 11 and the positive electrode portion 21. Accordingly, when the negative electrode 10 and the positive electrode 20 are stacked to overlap with each other, the negative terminals 12 may be positioned at a first side of the opposite ends of the pouch type battery cell, and the positive terminals 22 may be positioned at a second side of the opposite ends of the pouch type battery cell.

As described above, electrons may be dispersed and moved to two places when the negative terminals 12 protrude from opposite ends of the negative electrode portion 11, respectively, and the positive terminals 22 protrude from opposite ends of the positive electrode portion 21, respectively, and thus electrical resistance is reduced. In addition, the electrons may move through the nearer one of the two negative terminals 12 to decrease the travel route of the electrons, and thus even when the length of the pouch type battery cell is increased, the decrease in output due to this may be prevented.

Furthermore, the pouch type battery cell may include negative lead tabs 13 connected to the negative terminals 12 to allow electrons to be transmitted to the outside of the pouch type battery cell, and positive lead tabs 23 connected to the positive terminals 22 to allow electrons to be transmitted to the inside of the pouch type battery cell from the outside. First ends of the negative lead tabs 13 may be connected to the negative terminals 12 through ultrasonic welding, and second ends of the negative lead tabs 13 may extend toward the positive terminals 22 and overlap with the positive terminals 22 while spaced apart from each other.

First ends of the positive lead tabs 23 may be connected to the positive terminals 22 through ultrasonic welding, and second ends of the positive lead tabs 23 may extend toward the negative terminals 12 and overlap with the negative terminals while spaced apart from each other. The positive terminals 22 and the second ends of the negative lead tabs 13, and the negative terminals 12 and the second ends of the positive lead tabs 23 may be insulated by an insulator, respectively. The insulator may be formed as a separate member, and an electrode accommodating portion 41 of the pouch 40, which will be described later, may serve as an insulator.

Moreover, the pouch 40 may include the electrode accommodating portion 41 for accommodating the positive electrode portion 21 and the negative electrode portion 11 which are overlapped with each other while spaced apart from each other through the separator 30, negative terminal accommodating portions 42 disposed at a first side of opposite ends of the electrode accommodating portion 41 to accommodate the negative terminals 12, and positive terminal accommodating portions 43 disposed at a second side of the opposite ends of the electrode accommodating portion 41 to accommodate the positive terminals 22.

The negative lead tabs 13 may protrude to pass through the negative terminal accommodating portions 42 and overlap with the positive terminal accommodating portions 43. The second ends of the negative lead tabs 13 and the positive terminals 22 may be insulated from each other while spaced apart from each other through the positive terminal accommodating portions 43. The positive lead tabs 23 may protrude to pass through the positive terminal accommodating portions 43 and overlap with the negative terminal accommodating portions 42. The second ends of the positive lead tabs 23 and the negative terminals 12 may be insulated from each other while spaced apart from each other through the negative terminal accommodating portions 42.

Hereinafter, the manufacture of the pouch type battery cell constructed as described above will be described with reference to the drawings.

Figure 3:
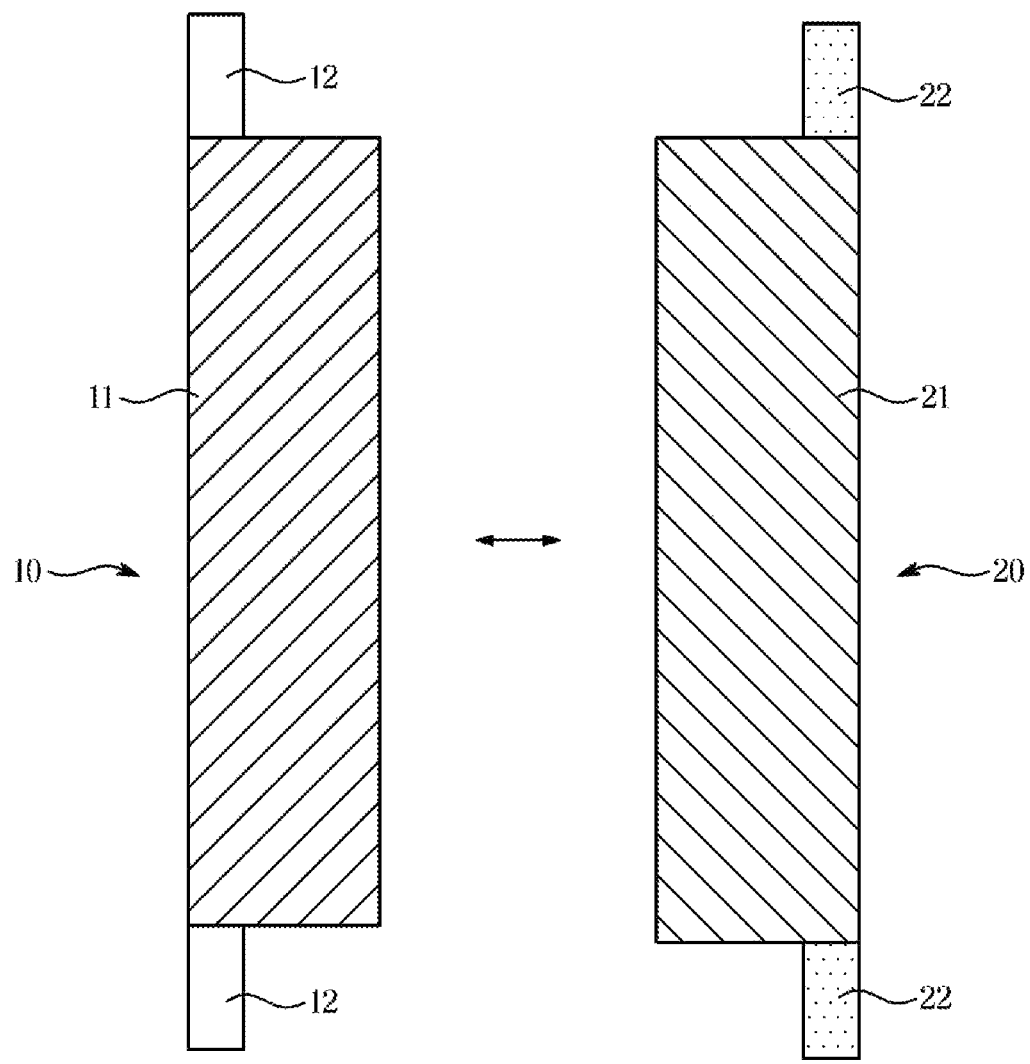
FIGS. 3 to 8 are schematic views illustrating manufacturing processes of a pouch type battery cell according to an exemplary embodiment of the present disclosure in turn.
Figure 4:
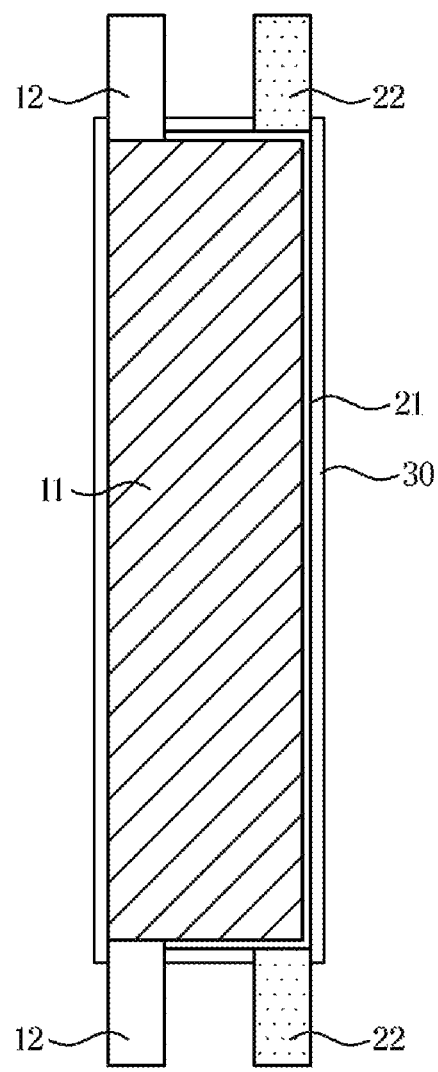
Figure 5:
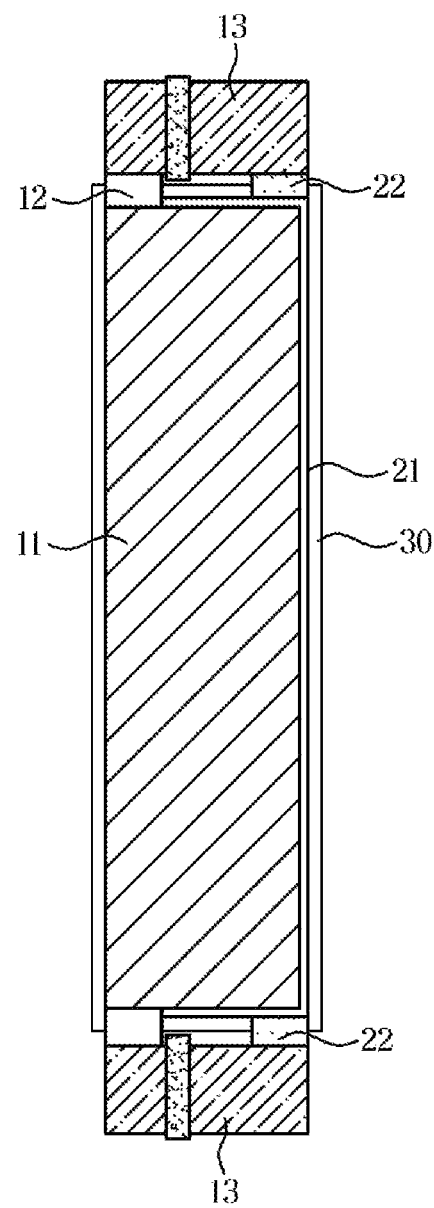
Figure 6:
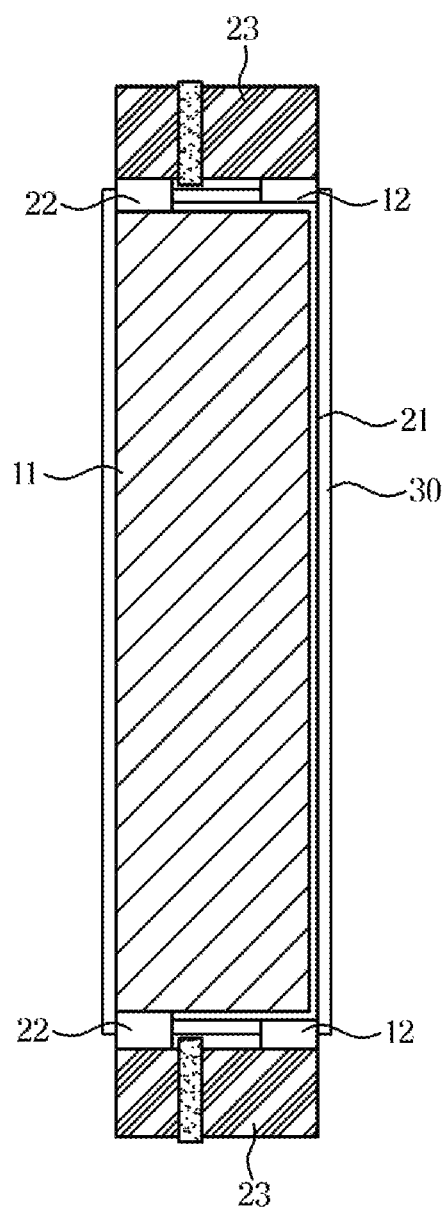
Figure 7:
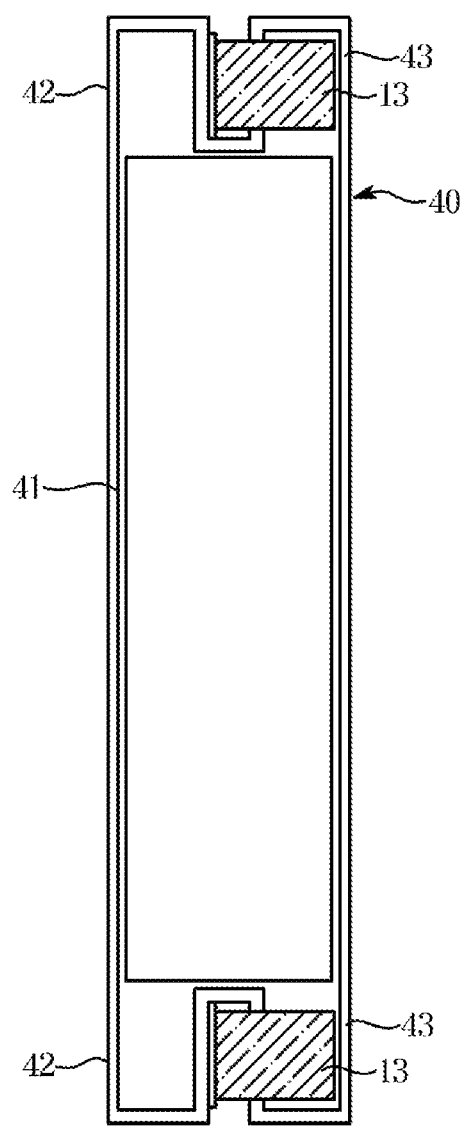

First, as illustrated in FIGS. 3 and 4, the negative electrode 10 and the positive electrode 20 may be overlapped with each other, and the negative electrode portion 11 and the positive electrode portion 21 may be overlapped with each other while spaced apart from each other through the separator. Next, as illustrated in FIG. 6, the negative lead tabs 13 may be fixed to the negative terminals 12 through ultrasonic welding, and as illustrated in FIG. 7, the positive lead tabs 23 may be fixed to the positive terminals 22 through ultrasonic welding. However, the present disclosure is not limited to ultrasonic welding and other types of fastening methods may be used to fix the components together.

Figure 8:
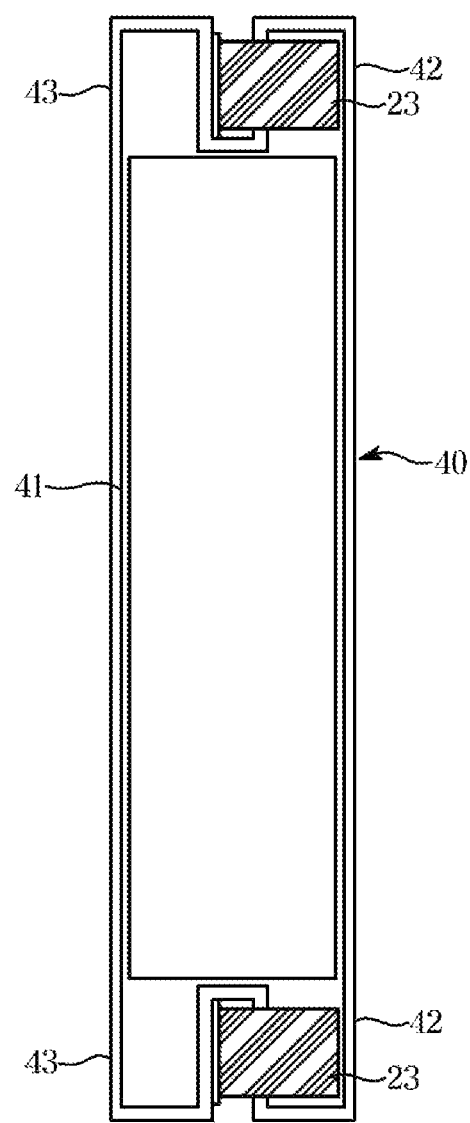

Finally, as illustrated in FIG. 8, the manufacture of the pouch type battery cell may be completed by allowing the negative electrode 10 and the positive electrode 20, which are overlapped with each other, to be accommodated in the pouch 40. Herein, the negative lead tabs 13 may be installed to protrude outward by passing through the negative terminal accommodating portions 42, and the positive lead tabs 23 may be installed to protrude outward by passing through the positive terminal accommodating portions 43.

As is apparent from the above, the pouch type battery cell according to an aspect of the present disclosure may prevent a decrease in output that may occur when the lengths of the negative electrode portion and the positive electrode portion are increased since the negative terminals may be disposed at opposite ends of the negative electrode and the positive terminals may be disposed at opposite ends of the positive electrode.

Although a few exemplary embodiments of the present disclosure have been shown and described, it would be appreciated by those skilled in the art that changes may be made in these exemplary embodiments without departing from the principles and spirit of the disclosure in the scope of which is defined in the claims and their equivalents.

What is claimed is:

1. A pouch type battery cell, comprising:
a negative electrode and a positive electrode overlapping each other while spaced apart from each other,
wherein the negative electrode includes a first end and a second end, and a pair of negative terminals that protrude from a first side of each of the first end and the second end of the negative electrode,
wherein the positive electrode includes a first end and the second end, and a pair of positive terminals that protrude from a second side of each of the first end and the second end of the positive electrode, and
wherein the pouch type battery cell further includes:
negative lead tabs having a first end connected to the negative terminals and a second end overlapping the positive terminals while spaced apart from each other; and
positive lead tabs having a first end connected to the positive terminals and a second end overlapping the negative terminals while spaced apart from each other.

2. The pouch type battery cell according to claim 1, wherein an insulator is formed to insulate between the positive lead tabs and the second ends of the negative terminals, and between the negative lead tabs and the second ends of the positive terminals.

3. The pouch type battery cell according to claim 1, wherein the negative electrode includes a plate-shaped negative electrode portion and the positive electrode includes a plate-shaped positive electrode portion.

4. The pouch type battery cell according to claim 3, wherein the pouch type battery cell further includes:
a separator disposed between the negative electrode portion and the positive electrode portion to overlap the negative electrode portion and the positive electrode portion while spaced apart from each other.

5. The pouch type battery cell according to claim 4, wherein the pouch includes:
an electrode accommodating portion for accommodating the positive electrode portion and the negative electrode portion that are overlapped with each other;
a pair of negative terminal accommodating portions disposed at a first side of opposite ends of the pouch to accommodate the pair of negative terminals; and
a pair of positive terminal accommodating portions disposed at a second side of the opposite ends of the pouch to accommodate the pair of positive terminals.

6. The pouch type battery cell according to claim 5, wherein the negative lead tabs protrude outside of the pouch by passing through the negative terminal accommodating portions, and the positive lead tabs protrude outside of the pouch by passing through the positive terminal accommodating portions.

7. The pouch type battery cell according to claim 2, further comprising:
a pouch for accommodating the pair of positive terminals and the pair of negative terminals therein.

* * * * *